Aug. 10, 1965   L. C. CHOUINGS   3,199,634
PIVOTABLE AND SLIDABLE, CLOSED LOOP TYPE SPOT DISC BRAKE
Filed Nov. 21, 1963   4 Sheets-Sheet 1

INVENTOR
Leslie C. Chouings
BY Winter, Ray, Adams and
Tockman ATTORNEYS

Aug. 10, 1965   L. C. CHOUINGS   3,199,634
PIVOTABLE AND SLIDABLE, CLOSED LOOP TYPE SPOT DISC BRAKE
Filed Nov. 21, 1963   4 Sheets-Sheet 2
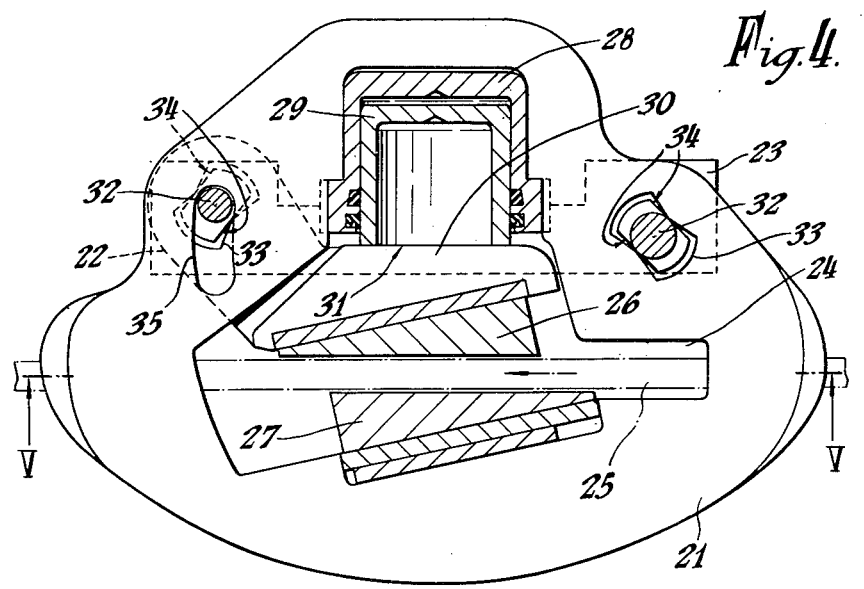
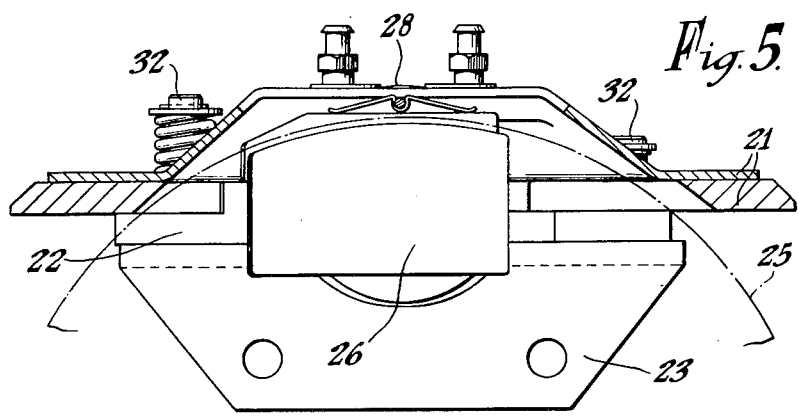
INVENTOR
Leslie C. Chouings
BY
Winter, Ray Adamo
Tockman
ATTORNEYS

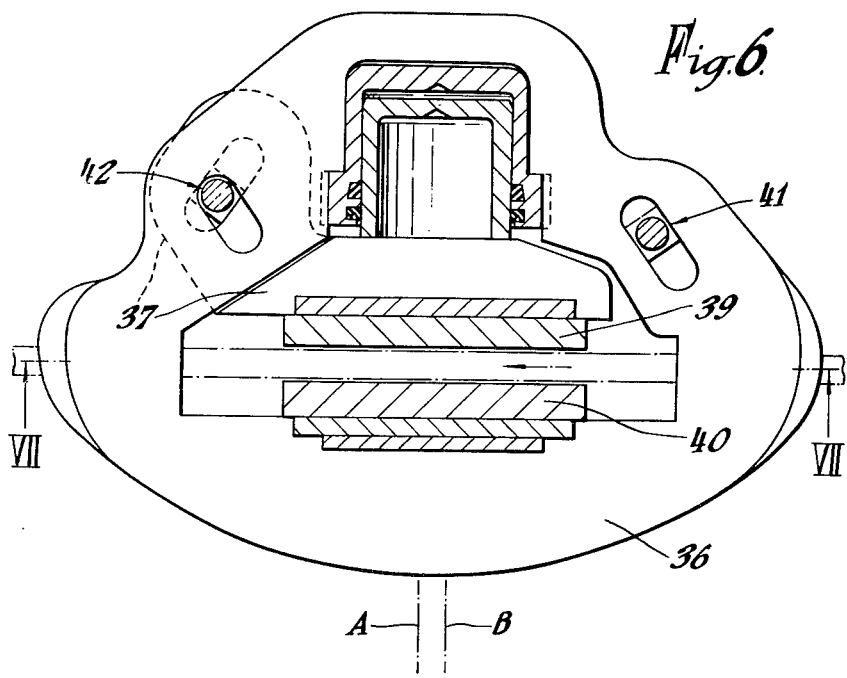
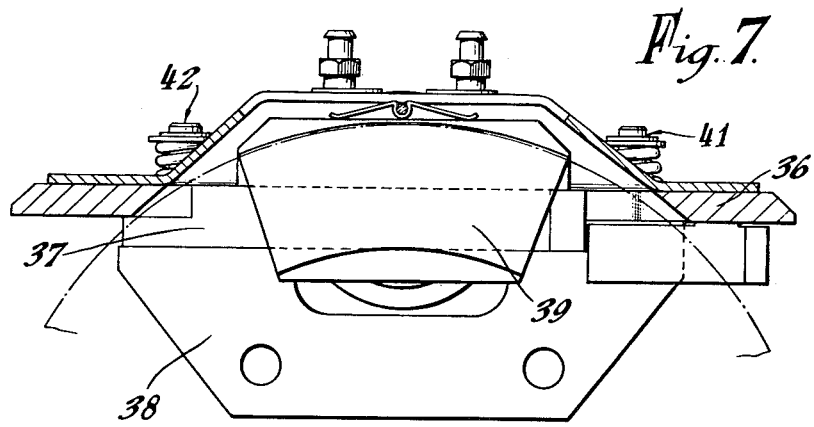

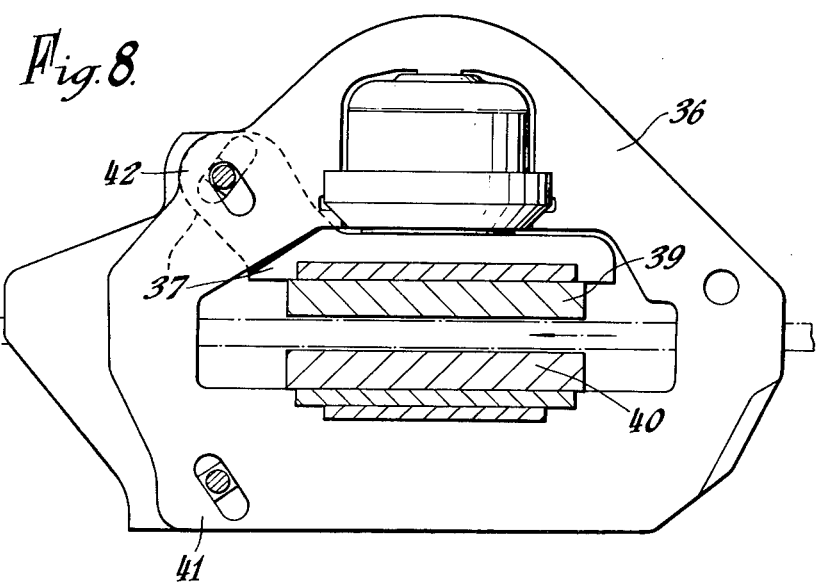

United States Patent Office 3,199,634
Patented Aug. 10, 1965

3,199,634
PIVOTABLE AND SLIDABLE, CLOSED LOOP
TYPE SPOT DISC BRAKE
Leslie C. Chouings, Leamington Spa, England, assignor to
Automotive Products Company Limited, Leamington
Spa, England
Filed Nov. 21, 1963, Ser. No. 325,309
Claims priority, application Great Britain, Nov. 22, 1962,
44,232/62
5 Claims. (Cl. 188—73)

This invention relates to disc brakes of the kind in which brake pads arranged on either side of the brake disc are each associated with a movable member each of which is pivotally mounted so as to be capable of swinging movement in a plane normal to the plane of rotation of the brake disc, movement of one of said movable members towards the brake disc upon actuation of brake actuating means causing the brake pad associated therewith to contact the brake disc the resulting reaction causing movement of the other movable member to bring the pad associated therewith also into contact with the brake disc.

The object of the invention is to provide improvements in the construction of disc brakes of the kind above referred to by means of which, under braking conditions, a balanced braking effect is obtained to reduce if not eliminate offset loading on the brake disc during braking.

To this end, in accordance with the invention, each movable member is mounted on a pivotal mounting each of which is carried by a fixed support for the brake mechanism the pivotal mountings being arranged so as to be disposed either one on either side of the brake disc or on the same side thereof whereby the drag force created as a result of contact of the brake pads with the brake disc when rotating is taken by the fixed support.

A disc brake according to the invention comprises for example a fixed support on or adapted for mounting on a stationary part of a vehicle wheel assembly, a first movable member associated with a brake pad or pads on one side of the brake disc and pivotally mounted on a pivotal mounting on said fixed support so as to be capable of swinging movement in a plane normal to the plane of rotation of the brake disc, a second movable member associated with a brake pad or pads on the opposite side of the brake disc to said first mentioned brake pad or pads said second movable member also being pivotally mounted on a pivotal mounting on said fixed support so as to be capable of swinging movement in a plane normal to the plane of rotation of the brake disc, and brake actuating means carried by said first movable member and operatively associated with said second movable member, actuation of said brake actuating means causing swinging movement of said second movable member to bring the brake pad or pads associated therewith into contact with the brake disc, the reaction, transmitted through the brake actuating means resulting in swinging movement of the first movable member to bring the brake pad or pads carried thereby also into contact with the brake disc.

Advantageously in a disc brake according to the present invention the first movable member is of closed loop construction as disclosed for example in the specification of our co-pending British application No. 35,727/60 corresponding to United States patent application S.N. 145,634, filed October 17, 1961. In addition each movable member can be mounted on a pivotal mounting comprising a pivot pin engageable in a slot, each slot extending at right angles to the drag force resultant of the brake as disclosed in the specification of our co-pending British application No. 41,435/62. Accordingly a disc brake having a first movable member of such closed loop construction, pin and slot pivotal mountings and adapted for operation by hydraulic liquid will now be described by way of example by aid of the accompanying drawings in which:

FIGURE 4 is a plan view also partly in section and with parts removed showing a further embodiment of the invention as applied to a disc brake of the kind above referred to;

FIGURE 5 is a section on the line V—V of FIGURE 4;

FIGURE 6 is a plan view, partly in section of a disc brake of the kind above referred to according to another embodiment of the invention;

FIGURE 7 is a view on the line VII—VII in FIGURE 6;

FIGURE 8 is a plan view showing a modification of the disc brake shown in FIGURE 6.

Figure 1:
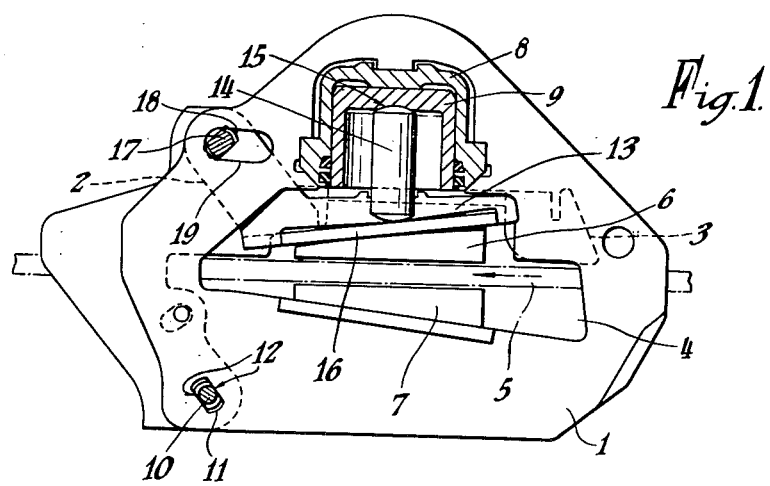
FIGURE 1 is a plan view, partly in section and with a part removed of a disc brake of the kind above referred to, according to one embodiment of the invention.
Figure 2:
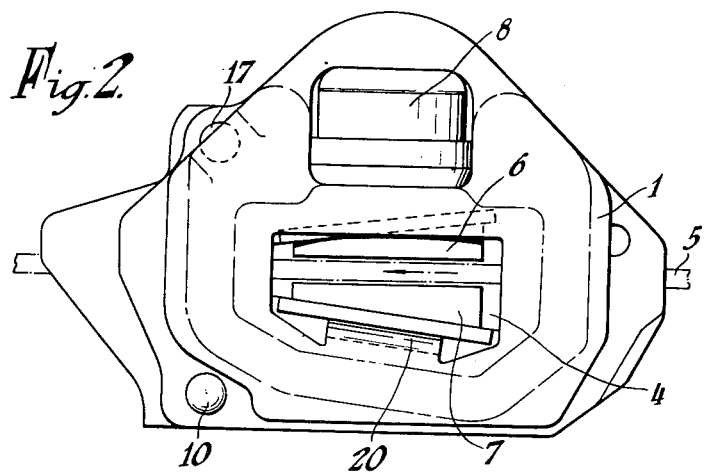
FIGURE 2 is a further plan view.
Figure 3:
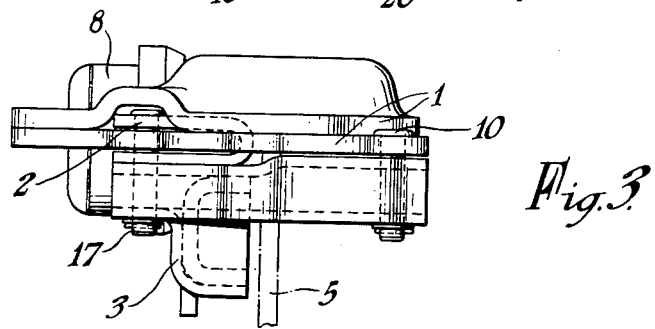
FIGURE 3 is an end view as seen from the left of FIGURE 2.

Referring to FIGURES 1, 2 and 3 of the drawings, the disc brake comprises generally a first movable member 1 and a second movable member 2, each pivotally mounted on a fixed support 3 on or adapted for mounting on a fixed part of a wheel assembly (not shown) so as to be capable of swinging movement in a plane normal to the plane of rotation of the brake disc. The first movable member 1 comprises either a single metal plate or is of laminar construction as shown, as disclosed in the specification of co-pending British application No. 35,727/60 corresponding to United States patent application S.N. 145,634, filed October 17, 1961, and has an opening 4 to receive a peripheral portion of the brake disc 5 and brake pads 6 and 7 arranged opposite to one another on either side of the brake disc. The first movable member 1 carries a hydraulic cylinder 8 adapted for connection to the hydraulic circuit of the brake system of a vehicle. The hydraulic cylinder 8 is located on the movable member so as to be positioned on one side of the brake disc with the outer end of the piston 9 of the hydraulic cylinder facing towards the brake disc, the piston being hollow, open at one end and assembled in the cylinder with its open end outermost. The pivotal mounting for the first movable member comprises a rotatable pivot pin 10 carried by the fixed support engageable in a slot 11 in the movable member 1. The shank of the pivot pin has flat surfaces 12 arranged opposite to one another and the slot has parallel longitudinal edges, the flat surfaces of the pivot pin contacting the opposite parallel edges of the slot. The pivotal mounting so formed is arranged so that the pivotal axis for the first movable member 1 is offset in relation to the drag force resultant of the brake so as to be on the side of the brake disc opposite to that on which the hydraulic cylinder is located, and to the axis of rotation of the brake disc, the longitudinal axis of the slot extending at right angles to the drag force resultant.

The second movable member 2 consists of an arm disposed on the same side of the brake disc as the hydraulic cylinder. A portion 13 of this arm extends between the hydraulic cylinder 8 and the brake disc 5 and carries the brake pad 6 of the arm being operatively connected to the piston of the hydraulic cylinder by a thrust member provided by a push rod 14. The push rod 14 extends into the hollow interior of the piston 9, the inner end of the rod being dome ended to fit in a correspondingly shaped recess 15 in the closed end of the piston. The outer end of the push rod is befurcated the portion 13 of the arm forming the movable member 2 passing through the bifurcated end of the push rod, the outer end of which is also domed and bears against an abutment surface provided by a metal backing plate 16 of brake pad 6. Angular movement of the push rod is therefore possible during actuation of the brake. The arm 2 is pivotally mounted adjacent one end on a pivotal mounting identical to that for the first movable member, the pivot pin 17 being rotatably mounted on the fixed support 3 and engageable in a slot 18 in the arm. The upper end of pivot pin 17 projects through an aperture 19 in the movable member 1, the aperture being dimensioned to provide clearance around the pivot pin 17. The two pivotal mountings are arranged so that the pivotal axes of both movable members are in alignment with one another and one on either side of the brake disc.

In operation, upon the admission of hydraulic liquid to the hydraulic cylinder 8, the piston 9 moves outwardly thus causing swinging movement of the arm providing the second movable member 2, towards the brake disc to bring the brake pad 6 carried thereby into contact with one side of the brake disc 5. The reaction created by such contact is transmitted through the hydraulic cylinder 8 to the first movable member 1 thus imparting swinging movement thereto in a direction opposite to said arm, this movement causing an abutment surface, for example an edge 20 of the opening 4 in the movable member 1, to engage the brake pad 7 associated therewith and bring the same also into contact with the brake disc whereby a braking action is obtained. During braking the drag force created as a result of contact of the brake pads 6, 7 with the rotating brake disc will be transmitted through the pivot pins to the fixed support 3 and a balanced braking action obtained.

The disc brake shown in FIGURES 4 and 5 of the drawings as in the previously described embodiment comprises generally a first movable member 21 and a second movable member 22, each pivotally mounted on a fixed support 23 on or adapted for mounting on a fixed part of a wheel assembly (not shown) so as to be capable of swinging in a plane normal to the plane of rotation of the brake disc. The first movable member 21 comprises either a single metal plate or is of laminar construction as shown, as disclosed in the specification of co-pending British application No. 35,727/60 corresponding to United States patent application S.N. 145,634, filed October 17, 1961, and has an opening 24 to receive a peripheral portion of the brake disc 25 and brake pads 26, 27 arranged on either side of the brake disc and partly offset in relation to one another. The first movable member 21 carries a hydraulic cylinder 28 adapted for connection to the hydraulic circuit of the brake system of a vehicle. The hydraulic cylinder 28 is located on the movable member 1 so as to be positioned on one side of the brake disc with the outer end of the hollow piston 29 which forms a thrust member, facing towards the brake disc.

The second movable member 22 consists of an arm disposed on the same side of the brake disc as the hydraulic cylinder 28. A portion 30 of this arm extends between the hydraulic cylinder and the brake disc and carries the brake pad 26 the arm portion 30 having an abutment face 31 engageable by the outer end of piston 29, said abutment face extending at right angles to the axis of the piston.

The pivotal mountings for the movable members are identical and are arranged on the same side of the brake disc, as shown on the side on which the hydraulic cylinder is disposed, the pivotal mountings being in alignment with one another and spaced one on either side of the axis of rotation of the brake disc, the pivotal mounting on the right of FIGURE 4 carrying the movable member 21 and that on the left of FIGURE 4 carrying the movable member 22. Each pivotal mounting comprises a stationary pivot pin 32 secured to the fixed support each of which is engageable in a slot 33 in the appropriate movable member each said slot having its longitudinal axis extending at right angles to the drag force resultant. The shank of each pivot pin 32 has oppositely disposed flat surfaces 34 and each slot has longitudinal edges which are non-parallel. Each such edge diverges outwardly from the central transverse axis of the slot so that each slot is narrowest at the said central transverse axis of the slot width increasing from the mid-point to the opposite ends thereof. The width at the mid-point of each slot is sufficient to permit the associated pivot pin to be assembled therein with the flat surfaces of the pin shank in contact with the mid-points of the slot, the angle of slope of the edges at each end of the slot being such as to permit the swinging movement of the movable member. An elongated aperture 35 in the movable member 21 provides clearance for the outer projecting end of the pivot pin 32 on which the second movable member 22 is pivotally mounted. In these embodiments of the invention the brake pads are taper pads, and the length of each slot is sufficient to permit sliding movement of each movable member in relation to the brake disc and in the direction of the axis of rotation of the brake disc to ensure even wear over the pad surfaces.

FIGURES 6, 7 and 8 of the drawings show disc brakes which are in general identical in construction to the brakes disclosed in the previously described embodiments but provided with "parallel" type brake pads. Thus in the embodiments of FIGURES 6, 7 and 8 the disc brakes each comprise generally, a first movable member 36 and a second movable member 37, each pivotally mounted on a fixed support 38 adapted for mounting on a fixed part of a wheel assembly (not shown) so as to be capable of swinging movement in a plane normal to the plane of rotation of the brake disc. In each disc brake the brake pads 39, 40 disposed on each side of the brake disc are of the parallel type. In the embodiment according to FIGURES 6 and 7 the pivotal mountings 41, 42 for the movable members 36, 37 respectively are disposed on the same side of the brake disc, each such pivotal mounting comprising a pivot pin having oppositely disposed flats on the shank thereof and a slot the longitudinal edges of which are parallel. In FIGURE 8, the pivotal mountings 41, 42 are disposed on opposite sides of the brake disc. In these two further embodiments the length of each slot is sufficient to permit sliding movement of each movable member in relation to the brake disc and in the direction of the axis of rotation of the brake disc whereby even wear over the brake pad surfaces is ensured. The lines A, B in FIGURE 6 show by way of example the lateral displacement of the centre lines of the pads as a result of pad wear, the line A representing the postiion of an unworn pad, the pads moving laterally progressively towards line B as wear takes place.

I claim:

1. A disc brake comprising a fixed support forming a flat platform, a first movable member including a flat integral closed loop plate having a central opening to receive the peripheral portion of a brake disc and brake pads on opposite sides of the brake disc, said first movable member having an elongated slot, a first pivot pin extending through said slot and fixed support pivotally connecting said first member on said fixed support for swingable movement in a plane normal to the plane of rotation of the brake disc, said pivot pin having a shank portion disposed in said slot to permit said first movable member to be slidably movable with respect to said brake disc substantially in the direction of the axis of rotation of the brake disc, a second movable member disposed on said fixed support provided with an arm portion extending along one side of the opening in said first member, said second member having an elongated slot, a second pivot pin extending through said second member slot and said fixed support pivotally connecting said second member on said fixed support for swingable movement in a plane normal to the plane of rotation of the brake disc, said second pin having a shank portion slidably disposed in said second member slot to permit said second member to be slidably disposed with respect to said brake disc substantially in the direction of the axis of rotation of the brake disc, said slots being disposed in spaced relationship with each other a substantial distance apart and in lateral alignment with each other, brake pads on said first and second members and disposed in said central opening on opposite sides of a brake disc adapted to extend therein, a brake actuating cylinder carried by said first member operatively connected to said second member to cause swinging movement of said second member to bring said second brake pad into contact with the brake disc extending through said opening, to move said brake pad on said first member into contact with the opposite side of said brake disc.

2. The brake of claim 1 wherein said shanks have flat parallel opposite surfaces, and said slots have parallel longtiudinal edges in contact with said shank surfaces, and said pins are disposed on opposite sides of said central opening, and on the same end of said closed loop plate.

3. A disc brake according to claim 1 wherein each pivot pin shank has oppositely disposed flat surfaces and each said slot has opposite longitudinal edges which are non-parallel, each such edge diverging outwardly from the central transverse axis of the slot to provide a slot which is narrowest at the said central transverse axis, the slot width increasing from the mid-point to the opposite ends thereof, the width at this point being sufficient to permit the pivot pin to be assembled therein with the flat surfaces in contact with the midpoints of the slot, the angle of slope of the slot edges being such as to permit the swinging movement of the movable member.

4. The disc brake of claim 1 wherein said slots are disposed to extend substantially at a right angle to the resultant braking force acting on its respective pivot pin.

5. The disc brake of claim 1 wherein said slots are disposed in oppositely extending directions.

References Cited by the Examiner

UNITED STATES PATENTS

| 2,663,384 | 12/53 | Chamberlain | 188—73 |
| 2,966,964 | 1/61 | Brueder | 188—73 |
| 3,141,527 | 7/64 | Henderson | 188—73 |
| 3,141,528 | 7/64 | Henderson | 188—73 |

FOREIGN PATENTS

| 614,338 | 2/61 | Canada. |
| 1,101,244 | 4/55 | France. |
| 732,272 | 6/55 | Great Britain. |

ARTHUR L. LA POINT, *Primary Examiner.*

EUGENE G. BOTZ, *Examiner.*